United States Patent
Lubbers et al.

(10) Patent No.: US 6,947,981 B2
(45) Date of Patent: Sep. 20, 2005

(54) FLEXIBLE DATA REPLICATION MECHANISM

(75) Inventors: Clark Lubbers, Colorado Springs, CO (US); Susan Elkington, Colorado Springs, CO (US); Randy Hess, Colorado Springs, CO (US); Stephen J. Sicola, Palmer Lake, CO (US); James McCarty, Colorado Springs, CO (US); Anuja Korgaonkar, Colorado Springs, CO (US); Jason Leveille, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 367 days.

(21) Appl. No.: 10/106,908

(22) Filed: Mar. 26, 2002

(65) Prior Publication Data
US 2003/0187945 A1 Oct. 2, 2003

(51) Int. Cl.⁷ .............................................. G06F 12/00
(52) U.S. Cl. ........................... 709/223; 714/6; 711/162; 711/114; 711/6; 707/204
(58) Field of Search ................................ 709/223, 213; 714/6; 711/162, 161, 170, 114, 6; 707/204

(56) References Cited

U.S. PATENT DOCUMENTS

| | | | |
|---|---|---|---|
| 5,533,190 A | | 7/1996 | Binford et al. |
| 5,682,518 A | * | 10/1997 | Inoue ......................... 711/162 |
| 5,692,155 A | * | 11/1997 | Iskiyan et al. ............... 711/162 |
| 5,721,918 A | | 2/1998 | Nilsson et al. |
| 5,893,155 A | | 4/1999 | Cheriton |
| 6,041,423 A | | 3/2000 | Tsukerman |
| 6,148,368 A | | 11/2000 | DeKoning |
| 6,148,414 A | * | 11/2000 | Brown et al. ................... 714/9 |
| 6,185,663 B1 | | 2/2001 | Burke |

(Continued)

OTHER PUBLICATIONS

Elkington, Susan, Enterprise Project, Data Replication Manager Functional Specification for VCS V3 Release, Compaq Computer Corporation, Nov. 30, 3001. pp. 1–68.

Hess, Randy and Korgaonkar, Anuja, Enterprise Project, DRM Logging, Compaq Computer Corporation, Nov. 25, 2001, pp. 1–12.

Hoffman, Brian, Enterprise Software Functional Specification V0.10, Compaq Computer Corporation, Jul. 25, 2001, pp. 1–26.

Multi–Directional Architectural Design, pp. 1–3.

Features and Benefits of HSG80 ACS 8.6P Data Replication Manager, COMPAQ White Paper, Oct. 2001, Enterprise Storage Group, Compaq Computer Corporation, PP. 1–15.

Storage Virtualization and the *StorageWorks* Enterprise Virtual Array, COMPAQ White Paper, Sep. 2001, Enterprise Storage Array Division Marketing, Compaq Computer Corporation, pp. 1–13.

SCSI–2 Spec—Logical characteristics, http://www.uni-mainz.de/~koenig/scsi/SCSI2–06.html, Mar. 8, 2002, pp. 3–31.

(Continued)

*Primary Examiner*—Hong Kim

(57) ABSTRACT

A data replication management (DRM) architecture comprising a plurality of storage cells interconnected by a fabric. Flexibility in connectivity is provided by configuring each storage cell port to the fabric to handle both host data access requests and DRM traffic. Each storage cell comprises one or more storage controllers that can be connected to the fabric in any combination. Processes executing in the storage controller find a path to a desired destination storage cell. The discovery algorithm implements a link service that exchanges information related to DRM between the storage controllers. The DRM architecture is symmetric and peer cooperative such that each controller and storage cell can function as a source and a destination of replicated data. The DRM architecture supports parallel and serial "fan-out" to multiple destinations, whereby the multiple storage cells may implement data replicas.

8 Claims, 5 Drawing Sheets

U.S. PATENT DOCUMENTS

| | | | |
|---|---|---|---|
| 6,275,783 B1 | 8/2001 | Okamura | |
| 6,601,187 B1 * | 7/2003 | Sicola et al. | 714/6 |
| 6,629,264 B1 * | 9/2003 | Sicola et al. | 714/15 |
| 6,643,795 B1 * | 11/2003 | Sicola et al. | 714/6 |
| 6,721,317 B2 * | 4/2004 | Chong, Jr. | 370/389 |
| 6,880,052 B2 * | 4/2005 | Lubbers et al. | 711/162 |
| 2002/0191649 A1 * | 12/2002 | Woodring | 370/906 |
| 2003/0084241 A1 * | 5/2003 | Lubbers et al. | 711/114 |
| 2003/0115073 A1 * | 6/2003 | Todd et al. | 705/1 |
| 2003/0187847 A1 * | 10/2003 | Lubbers et al. | 707/9 |
| 2003/0187861 A1 * | 10/2003 | Lubbers et al. | 707/102 |
| 2003/0187947 A1 * | 10/2003 | Lubbers et al. | 709/217 |
| 2003/0188035 A1 * | 10/2003 | Lubbers et al. | 709/310 |
| 2003/0188114 A1 * | 10/2003 | Lubbers et al. | 711/162 |
| 2003/0188119 A1 * | 10/2003 | Lubbers et al. | 711/171 |
| 2003/0188218 A1 * | 10/2003 | Lubbers et al. | 714/5 |
| 2003/0188229 A1 * | 10/2003 | Lubbers et al. | 714/47 |

OTHER PUBLICATIONS

Understanding Replication in Databases and Distributed Systems, Jul. 13, 1997, Computer Based Learning Unit, University of Leeds, pp. 1–26.

ENSA–2 *VersaStor* Virtualization Technology, Enterprise Storage Group, *Storage Works* by COMPAQ White Paper, Dec. 2001, Compaq Computer Corporation, pp. 1–10.

NCITS T10, Project 1144D, Revision 07a, Nov. 1, 2001, pp. 8–26.

StorageWorks by Conpaq Enterprise Virtual Array, Quick-Specs, World Wide– version 5, Feb. 27, 2002, pp. 1–12.

T10/98–203 revision 0, Persistent Reservations, Jul. 7, 1998, pp. 1–20.

iSCSI: ISID and the New Persistent Reservations Proposals, http://www.pdl.cmu.edu/mailinglists/ips/mail/msg07055.html, Mar. 19, 2002, pp. 1–4.

Software Product Description, Compaq SANworks Virtual Replicator–Version 2.0, SPD: 70.41.02, Jun. 5, 2000, pp. 1–5, Compaq Computer Corporation.

Features and Benefits of HSG80 ACS 8.6P Data Replication Manager, Oct. 2001, pp. 1–22, Compaq White Paper, Enterprise Storage Group, Compaq Computer Corporation.

Information Systems—dpANS Fibre Channel Protocol for SCSI, revision 012, Dec. 4, 1995, pp. i–63, American National Standard–draft.

Information Technology– Fibre Channel Protocol for SCSI, second version (FCP–2), Nov. 1, 2001, pp. ii–133, American Natiional Standard–draft.

\* cited by examiner

FLEXIBLE DATA REPLICATION MECHANISM

FIELD OF THE INVENTION

The present invention relates generally to error recovery in data storage systems, and more specifically, to a system for providing controller-based remote data replication using a redundantly configured Fibre Channel Storage Area Network to support data recovery after an error event and enhance data distribution and migration.

BACKGROUND OF THE INVENTION AND PROBLEM

Recent years have seen a proliferation of computers and storage subsystems. Demand for storage capacity grows by over seventy-five percent each year. Early computer systems relied heavily on direct-attached storage (DAS) consisting of one or more disk drives coupled to a system bus. More recently, network-attached storage (NAS) and storage area network (SAN) technology are used to provide storage with greater capacity, higher reliability, and higher availability. The present invention is directed primarily SAN systems that are designed to provide shared data storage that is beyond the ability of a single host computer to efficiently manage.

Mass data storage systems are implemented in networks or fabrics that provide means for communicating data between systems that use data, and the storage systems that implement the physical storage. In many cases, host computers act as storage servers and are coupled to the network and configured with several disk drives that cumulatively provide more storage capacity or different storage functions (e.g., data protection) than could be implemented by a DAS system. For example, a server dedicated to data storage can provide various degrees of redundancy and mirroring to improve access performance, availability and reliability of stored data. Collecting storage sub-systems, where a separate server manages each sub-system, can form a large storage system. More recently, virtualized storage systems such as the StorageWorks® Enterprise Virtual Array announced by Compaq Corporation in October, 2001 provide storage controllers within a fabric or network that present virtualized storage to hosts that require data storage in a manner that enables the host to be uninvolved in the physical configuration, allocation and management of the storage devices. StorageWorks is a registered trademark of Compaq Computer Corporation. In this system, hosts simply access logical units of storage that appear to the host as a range of logical address space. Virtualization improves performance and utilization of storage.

SAN systems enable the possibility of storing multiple copies or "replicas" of data at various physical locations throughout the system. Data replication across multiple sites is desirable for a variety of reasons. To provide disaster tolerance, copies of data stored at different physical locations is desired. When one copy becomes unavailable due to equipment failure, a local network outage, natural disaster or the like, a replica located at an alternate site can allow access to the data. Replicated data can also theoretically improve access in normal operation in that replicas can be accessed in parallel, avoiding bottlenecks associated with accessing a single copy of data from multiple systems. However, prior systems were organized such that one site had a primary role and another site was a replica. Access requests were handled by the primary site until failure, at which time the replica became active. In such architecture, the replica provided little benefit until failure. Similarly, the resources allocated to creating and managing replicas provided minimal load balancing benefit that would enable data access requests to be directed intelligently to replicas such that resources were used more efficiently. Moreover, when multiple replicas are distributed throughout a network topology, it would be beneficial if network delays associated with accessing a topologically remote storage subsystem could be lessened.

In the past, managing a data replication system required significant time and expense. This time and expense was often related to tasks involved in setting up and configuring data replication on a SAN. Physical storage devices between original and replica locations had to be closely matched which could require knowledge at the spindle level to set up a storage site to hold a replica. Similarly detailed knowledge of the physical devices at a storage site were required to set up logging of replication operations. Moreover, the logical structures used to represent, access and manage the stored data had to be substantially identically reproduced at each storage site. Many of these operations required significant manual intervention, as prior data replication architectures were difficult to automate. This complexity made it difficult if not impossible to expand the size of a replicated volume of storage, as the changes on one site needed to be precisely replicated to the other site. A need exists to provide data replication systems in a SAN that enable functions involved in setup and configuration of a replication system to be automated, and allow the configuration to be readily expanded.

It is desirable to provide the ability for rapid recovery of user data from a disaster or significant error event at a data processing facility. This type of capability is often termed 'disaster tolerance'. In a data storage environment, disaster tolerance requirements include providing for replicated data and redundant storage to support recovery after the event. In order to provide a safe physical distance between the original data and the data to be backed up, the data is migrated from one storage subsystem or physical site to another subsystem or site. It is also desirable for user applications to continue to run while data replication proceeds in the background. Data warehousing, 'continuous computing', and enterprise applications all benefit from remote copy capabilities.

Compaq Corporation introduced a data replication management product in its Array Controller Software (ACS) operating on an HSG80 storage controller and described in U.S. patent application Ser. No. 09/539,745 assigned to the assignee of the present application and incorporated herein by reference. This system implemented architecture with redundant storage controllers at each site. Two sites could be paired to enable data replication. While effective, the HSG80 architecture defined relatively constrained roles for the components, which resulted in inflexibility.

For example, each of the controllers comprised one port that was dedicated to user data, and a separate port that was dedicated to data replication functions. Even where redundant fabrics were implemented, for a given controller both of these ports were coupled to a common fabric switch. Despite the fact that each controller had two ports for communicating with other controllers, one of the ports was constrained in the role of handling user data, and the other port was constrained in the role of handling data replication. Failure of either port would be, in effect, a failure of the entire controller and force migration of storage managed by the failed controller to the redundant controller. Similarly, failure of a communication link or fabric coupled to one port or the other would render the controller unable to perform its tasks and force migration to the redundant controller. Such migration was disruptive and typically required manual intervention and time in which data was unavailable.

As another example, prior data replication management solutions simplified the implementation issues by assigning fixed roles to storage locations. A particular storage site would be designated as a primary when it handled operational data traffic, and another site would be designated as a secondary or backup site. Such architectures were unidirectional in that the backup site was not available for operational data transactions until the failure of the primary site. Such rigidly assigned roles limited the ability to share storage resources across multiple topologically distributed hosts. Moreover, configuration of such systems was complex as it was necessary to access and program storage controllers at both the primary and secondary sites specifically for their designated roles. This complexity made it impractical to expand data replication to more than two sites.

This lack of flexible configuration results in constraints imposed on the configuration and functionality of DRM implementations. Most existing data replication solutions have specific constraints around the number of places that the data may be copied, the simultaneity of multi-directional copies. Further, the specific nature of the synchronicity of the data transmission between sites was per controller, not per volume. As a result, all of the copy sets managed by a particular controller had the exact same initiator and target role designations. Also, all copy sets had to go in one direction such that if a controller was an initiator for one copy set, it was an initiator for all copy sets managed by that controller. Further, the replicas were not allowed to vary from the original in any material respect. The target disks were required to have the same size, data protection scheme, and the like as the original. Prior systems could not readily support dynamic changes in the size of storage volumes.

The lack of flexible configuration constrains the number of replicas that can be effectively created. Current systems allow an original data set to be replicated at a single location. While a single replica is beneficial for disaster tolerance, it is of limited benefit to improving performance benefits from migrating or distributing data to locations closer to where the data is used. A need exists for a data replication system that improves the ability to fan-out a larger number of replicas to improve geographic and topological diversity.

Therefore, there remains a need in the art for a data storage system capable of providing flexible data replication services without the direct involvement of the host computer. Moreover, a data storage system is needed that is readily extensible to provide multiple replication, load balancing, and disaster tolerance without limitations imposed by designating rigid roles for the system components.

SUMMARY OF THE INVENTION

Briefly stated, the present invention involves architecture for flexible data replication management comprising first and second storage cells at separate topological locations on a storage area network. Each storage location comprises a storage controller having first and second ports coupled to a communication network, and a pool of storage devices accessible through the controller. Each of the first and second ports communicates both user data and replication data with the communication network. Preferably, each storage location is enabled to operate as a source that initiates replication of data stored within its pool of storage devices, and as a destination for storing replicas of data stored within storage devices of another storage location. Preferably, the communication network comprises redundant subnetworks, and each controller is coupled such that the first port couples to one of the sub-networks and the second port couples to another of the sub-networks.

DETAILED DESCRIPTION OF THE PREFERRED EMBODIMENTS

In general, the present invention describes a data replication management (DRM) architecture comprising a plurality of storage cells interconnected by a data communication network such as a fibre channel fabric. The present invention emphasizes symmetry and peer-cooperative relationships amongst the elements to provide greater flexibility in configuration and operation. Storage cells are for the most part autonomous units of virtualized storage that implement hundreds of gigabytes to terabytes of storage capacity. In accordance with the present invention, each storage cell can act as a source or primary location for data storage, and at the same time act as a destination or secondary location holding a replica data from a primary location of another storage cell. Similarly, the architecture of the present invention seeks to minimize rigid roles placed on interface ports and connections such that all available connections between components can support both host data traffic (e.g., traffic involving data that is to be stored and retrieved), and DRM traffic (e.g., traffic related to managing replicas between storage cells). In this manner, resources are efficiently deployed and operational performance is improved.

The present invention is described with various levels of specificity to ease description and understanding. However, unless specified otherwise, the specific implementations are examples only, and not limitations of the invention. For example, network connectivity is illustrated by fibre channel mechanisms, however, other network mechanisms provide suitable functionality in particular environments. In particular implementations, storage capacity is presented as SCSI (small computer system interface) logical units, although the particular protocol is readily varied to meet the needs of a particular application.

Figure 1:
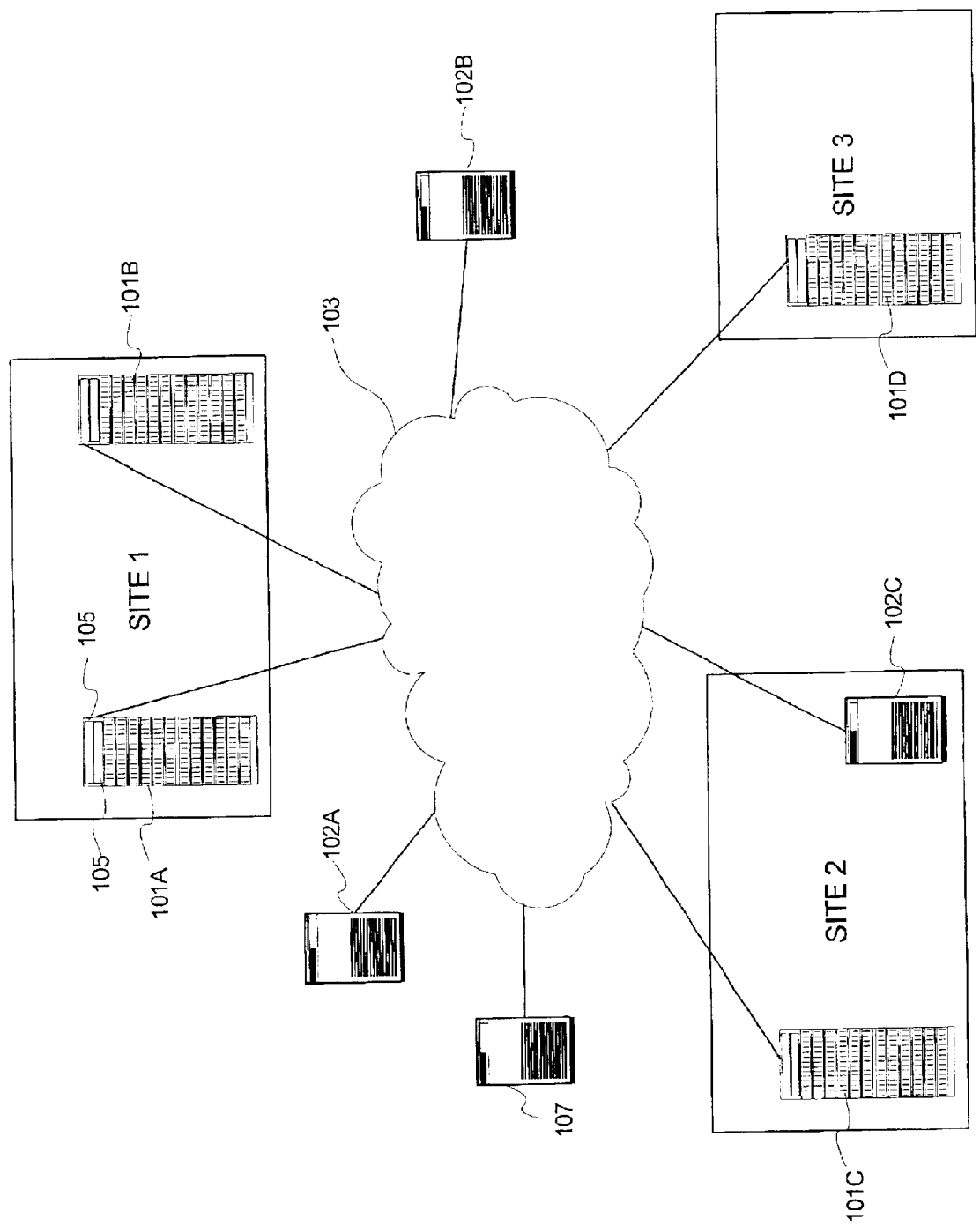
FIG. 1 shows a storage area network (SAN) environment in which the present invention is implemented.

FIG. 1 illustrates a multi-site storage area network (SAN) implementing features in accordance with present invention. The example shown in FIG. 1 includes only three sites (Site 1, Site 2 and Site 3) for to ease illustration and understanding, however, it should be understood that any number of sites may be provided to meet the needs of a particular application. The various sites may be physically proximate, or separated by an arbitrary distance. A particular implementation may well limit the number of possible sites, and may well limit the maximum or minimum physical separation of sites. Each site includes one or more storage cells 101, such as cells 101A, 101B, 101C and 101D. Any number of storage cells 101 maybe included in any site, although the number implemented in any particular application may be constrained to meet the needs of that application.

The storage implemented at various sites is accessed by host computer 102, such as host computers 102A, 102B and 102C. Host computers are generally machines that consume or require data storage. Typical host computers 102 demand large quantities of storage such as mainframes, web servers, transaction processors, and the like. However, a host computer 102 may comprise a computer of any processing capacity that requires or benefits from network storage either to reduce cost of the host 102, implement more storage capacity than practical in a host 102, share data amongst multiple hosts 102, or the like. A host computer 102 may couple to the storage cells 101 via a connection to network 103 such as illustrated by host computers 102A and 102B. In many cases, a host computer 102 will be located in a site such as host computer 102C located in site 2. The topological location of host computers 102 is a matter of design choice selected to meet the needs of the particular application. In many cases, one or more host computers 102 will be located at a site. It should be appreciated, however, that host computers 102 have little to do with the management and configuration of the DRM system of the present invention, other than the reality that as consumers of data, the DRM system is preferably able to satisfy storage needs of host computers 102 at various physical and topological locations.

Storage cells 101 and hosts 102 couple to data communication network 103. Storage cells 101 implement a quantity of data storage capacity that is accessible through storage controllers 105 that implement one or more connections to network 101. Storage cells 101 typically implement hundreds of gigabytes to terabytes of physical storage capacity. Preferably, controllers 105 virtualize the physical storage capacity such that it is configurable into logical units (LUNs) of storage capacity. The LUNs implement an arbitrary quantity of logical address block storage, where each LUN has a specified level of data protection such as RAID 0–5 data protection.

The logical construction or context of a storage cell 101 comprises the logical and data structures that are used to represent, manage and configure the raw physical storage capacity into devices that can be accessed by hosts 102 in a desired manner. To do this, controllers 105 implement and manage various logical objects that implement data structures and behavior to represent various components of each storage cell 101, preferably without involvement if hosts 102. All objects in the system are identified with a universally unique identification (UUID). The UUIDs are stored persistently in metadata structures within the physical storage which enables all or part of a storage cell, and all the LUNs implemented therein, to be mapped and presented by any storage controller 105. In a data replication application, the ability to present the LUNs and the context in which they exist is useful, as described in greater detail below, in event of a controller failure at one of the replica sites.

Of particular significance to the present invention is a logical object representing each LUN that is presented to a host system 102. In addition to the UUID, LUNs are also identified by a worldwide LUN ID (WWLID) which identifies the LUN to hosts 102. Hosts 102 access physical storage capacity by addressing read and write operations to specified LUNs using the WWLID, and can be otherwise unaware of the physical storage architecture or data protection strategy for a particular LUN that is being accessed. Storage controllers 105 manage the tasks of allocating physical storage capacity to specified LUNs, monitoring and maintaining integrity of the LUNs, moving data between physical storage devices, and other functions that maintain integrity and availability of the data stored therein.

Network 103 comprises any of a variety of available networks, and may comprises a plurality of interconnected networks. In particular examples, network 103 comprises at least two independent fibre channel fabrics to provide redundancy. These fibre channel fabrics may comprise long-distance connection mechanism 201 such as asynchronous transfer mode (ATM) and Internet protocol (IP) connections that enable sites to be separated by arbitrary distances.

At least one SAN management appliance (SMA) 107 is coupled to network 103 to enable connections to storage cells 101. In practice, a number of SMAs 107 are provided, and typically an SMA 107 is located at each site to provide management operation for the storage cells 101 at that site. However, because each SMA 107 communicates through network 103, the physical location of SMAs 107 is arbitrary. SMAs 107 are preferably implemented at topological locations that provide redundant connections to the storage cells 101.

Figure 2:
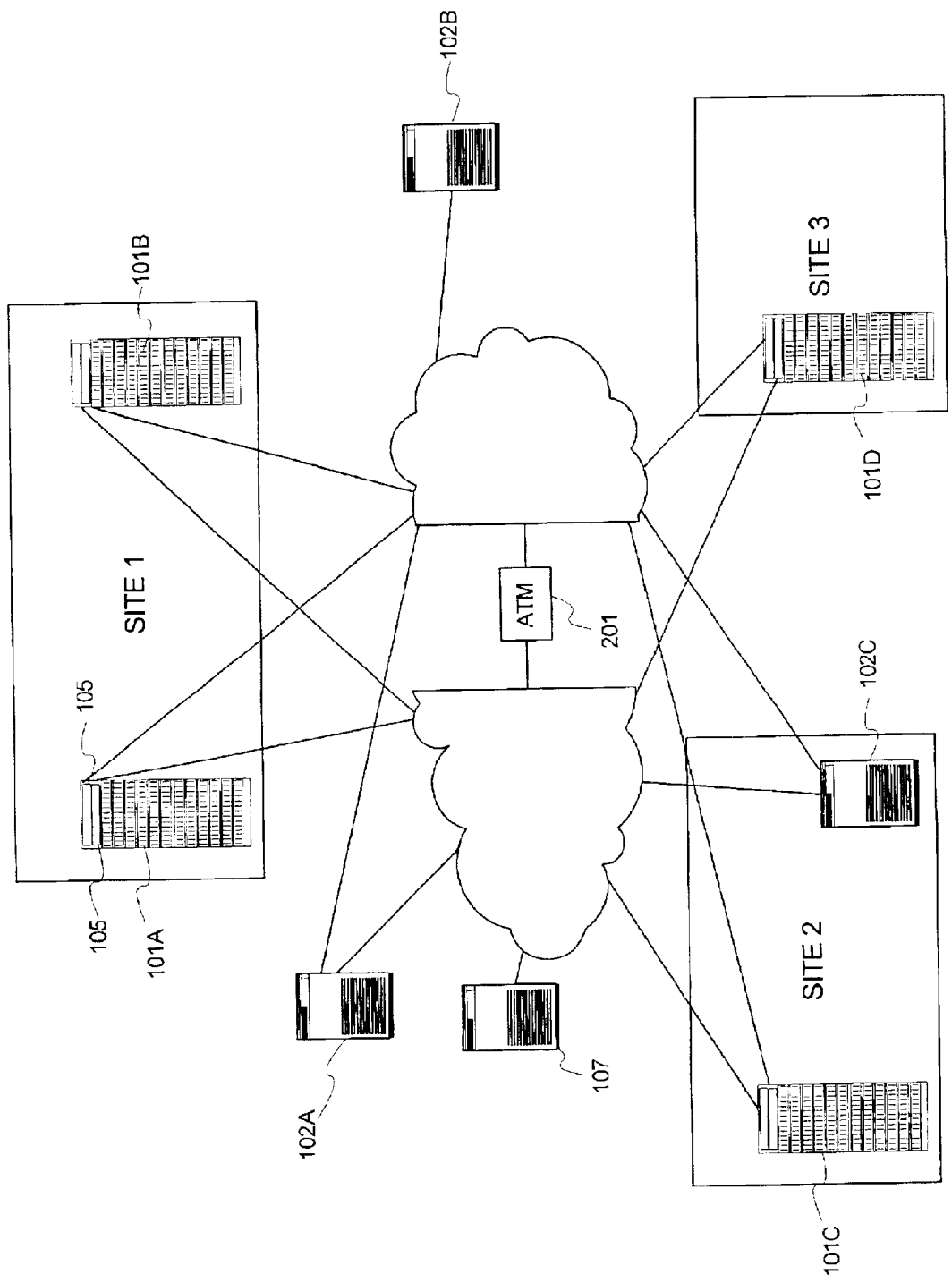
FIG. 2 illustrates an alternative SAN environment embodying the present invention.

Network 103 is accessible directly or indirectly to all components at Site 1, Site 2, and Site 3 including hosts 102 and controllers 105. In preferred implementations, each component has redundant links to network 103, and network 103 is preferably implemented as having redundant sub-networks as shown in FIG. 2. Redundancy provides connectivity in event of failure or degradation of some portions of network 103. Redundancy also enables connectivity in event of failure or degradation of controllers 105 and/or interface components of hosts 102. In prior data replication systems, it was known to provide multiple channels between components, however, these channels were not interchangeable. For example, each controller might have two host ports to a network, however, one of the ports was designed to support operational data traffic while the other port was dedicated to data replication operations. While this division of responsibility was simpler to implement, it increased the likelihood that one or the other of the ports would be used at less than full capacity. Moreover, special purpose ports are not completely redundant, hence the system would be vulnerable to failure of one or the other of the channels. Even where two controllers were provided, this asymmetry between ports affected performance.

In the systems of FIG. 1 and FIG. 2, it is important to realize that storage cell 101 is able to function as a primary storage location for any of hosts 102, and at the same time function as a secondary or alternative storage location for a replica of data from another storage cell 101. This feature is referred to as "bi-directionality". Unlike prior DRM systems where sites were rigidly configured as either primary or secondary sites, the present invention provides for flexible assignment at a much finer level of granularity, preferably such that individual virtual disks can be designated as either primary or alternate. One effect of such flexibility is that it becomes practical to implement enormous quantities of storage in each storage cell 101 as the capacity at each site can be readily applied to various applications with disparate storage needs.

Figure 3:
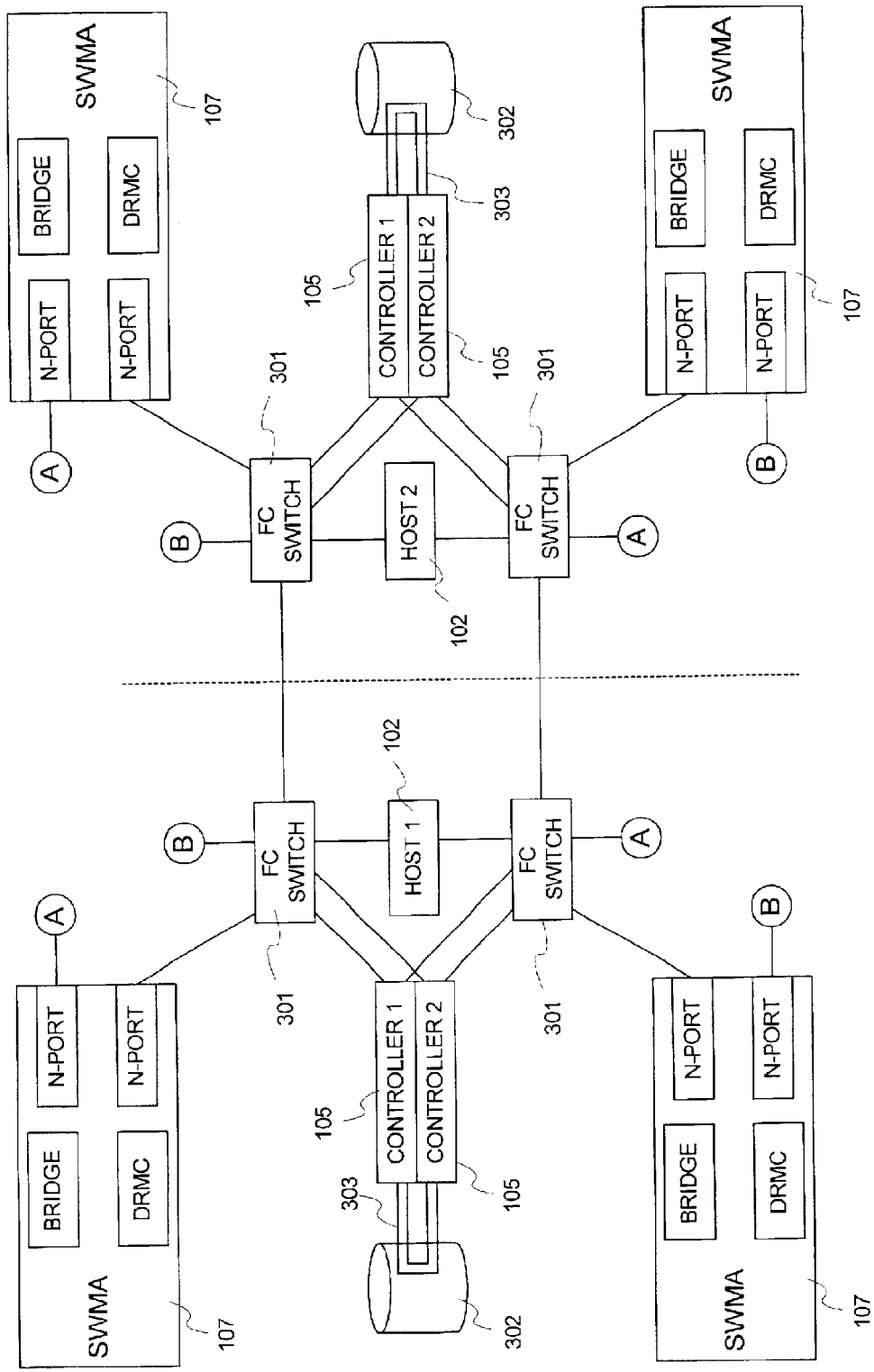
FIG. 3 shows an implementation emphasizing redundant connections to improve disaster tolerance.

FIG. 3 illustrates various features of the present invention embodied in a disaster tolerant configuration. The configuration of FIG. 3 emphasizes redundancy in physical components. As a result, multiple paths exist between any host and any storage. Storage management appliances 107 include a Bridge and a data replication management console (DRMC) which are cooperative software processes that each present a user interface for configuration and monitoring of DRM processes. The Bridge functions as an element manager for controllers 105, and handles basic functions of connecting to the communication network 103, issuing commands to controllers 105, and implementing security policies. All customer configuration and monitoring of DRM activities goes through the Bridge. The DRMC is provides increased functionality over the Bridge interface, by managing solely DRM storage and providing assists, such as with site recovery.

One goal of a disaster tolerant configuration in FIG. 3 is to provide hardware redundancy for multiple levels of fault tolerance in order to keep the primary and alternate sites running, almost at 'non-stop' metrics (seconds per year downtime, barring disaster or planned downtime). In the face of single component failures at a site, DRM will failover to a redundant component at that site to allow continued operation. If a significant failure happens to the primary site, then data processing can be resumed at the alternate site where the data is intact. Database or application recovery is achieved with little or no downtime.

In this regard, wherever redundant components are provided, they are preferably interchangeable in accordance with the present invention such that functionality of one component can be taken over by a redundant component. For example, node ports in the SMA 107 are redundant such that failure of one node port can be handled by moving functions handled by that port over to the other, non-failed node-port.

Physical storage devices 302 are coupled to controllers 105 by a high-speed redundant connection such as fibre channel arbitrated loop (FCAL) connections 303 in FIG. 3. An FCAL connection allows each of tens or hundreds of individual hard disk drives to be accessed not only at high speed, but by either controller 105 in a storage cell. Further, by providing redundant FCALs, one FCAL can fail while each storage device 302 remains accessible by either controller. The present invention is largely independent of the specific implementation of physical storage devices 302, and it is contemplated that other physical storage architectures will provide suitable equivalents for purposes of the present invention.

FIG. 3's disaster tolerance configuration provides for high availability with a dual fabric implemented by switches 301, dual hosts 102, and dual storage topology, where a single switch, host, or storage can fail and the system can still continue access on the SAN. Each fabric is composed of two switches 301, with the switches connected to each other over what is called an E-port, or expansion port. The E-port can be a connection with distances that vary depending on technology. Fibre Channel allows for 10 km and with extenders up to 100 km. ATM provides for 'round the world' distances. New technology, called FC-BB (Fibre Channel Backbone), provides the opportunity to extend Fibre Channel over leased Telco lines (also called WAN tunneling). There is no theoretical constraint imposed on the number of switches 301, although a particular implementation may choose to impose such a constraint. With more switches 301, the fabric 103 becomes more complex and port-to-port communications may require more "hops". Hence, both the latency and the variability in latency increase with more complex fabrics.

Hosts 102 preferably run multi-pathing software that dynamically allows failover between storage paths as well as static load balancing of storage volumes (LUNs) between the paths of controllers 102. Multi-pathing software enables a host 102 to identify multiple connection options that lead to desired storage, and select amongst the available paths based on selected criteria. These criteria may vary widely, but typically include path availability, path performance, path load, controller load, and the like. This allows for applications to continue given any failure of fabric or the controllers. A lower cost variant of this configuration uses a fabric comprising only one switch, such that there is no E-port. Such a configuration may be appropriate for shorter distances.

Figure 4:
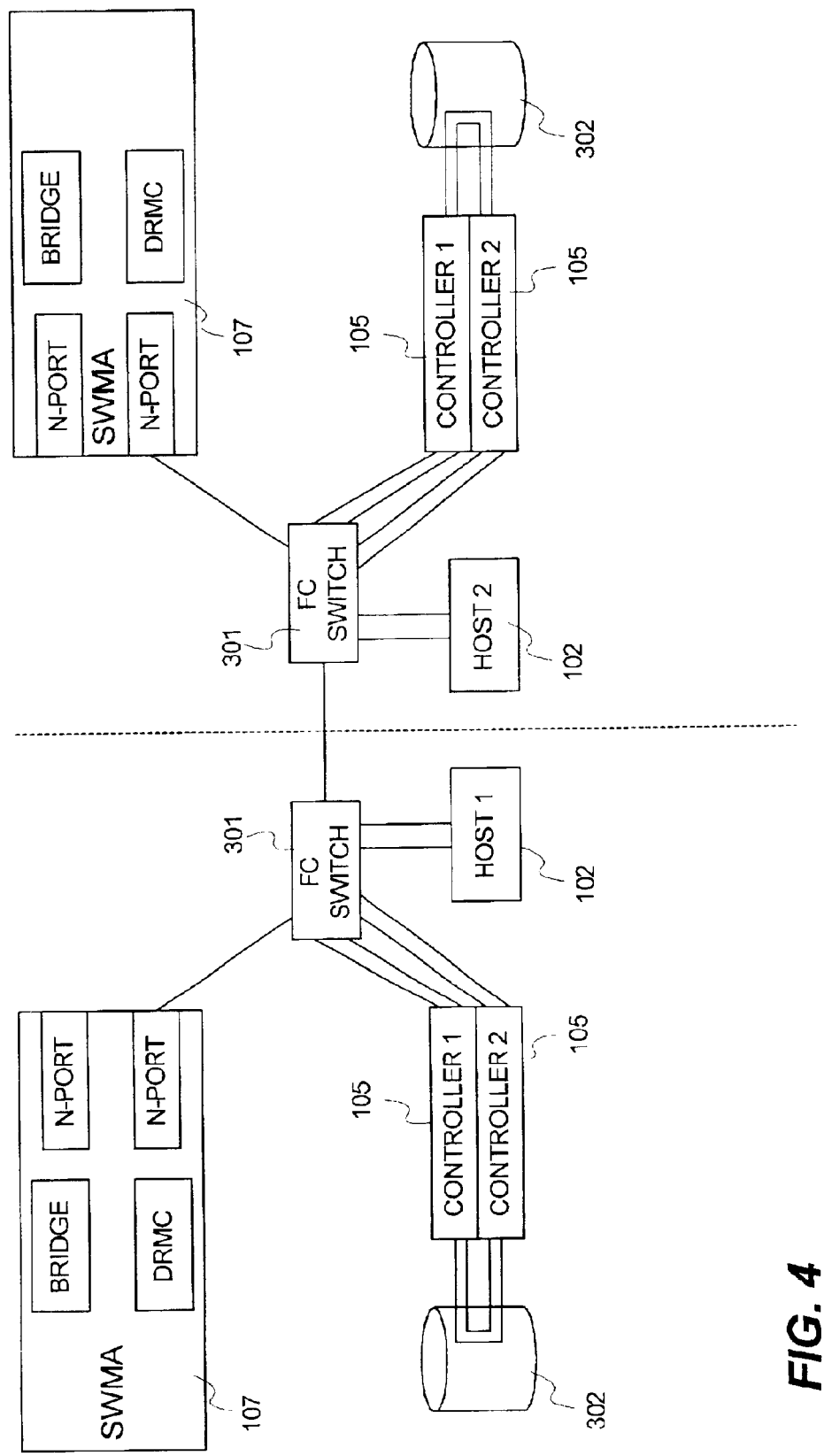
FIG. 4 illustrates an implementation with less redundancy than the implementation of FIG. 3.
Figure 5:
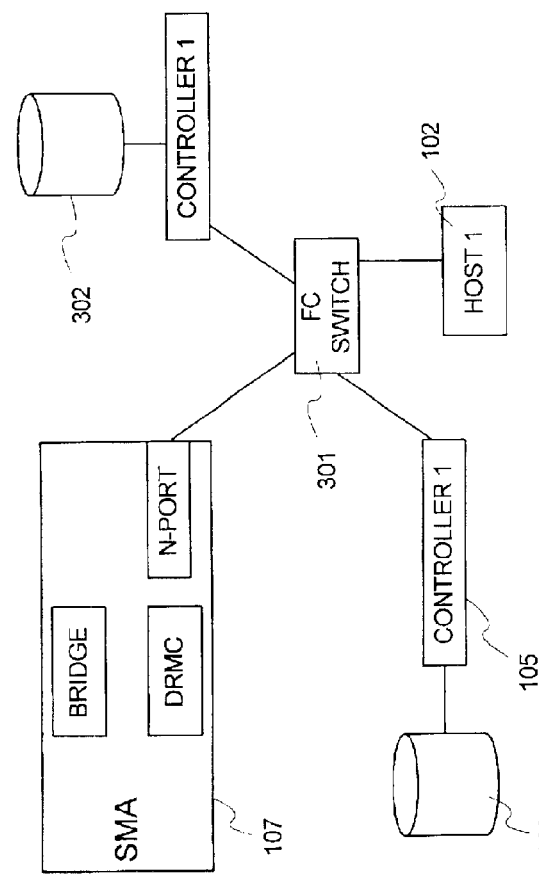
FIG. 5 illustrates a basic implementation of the present invention.

FIG. 4 illustrates a configuration of the present invention that emphasizes data movement rather than redundancy of the example in FIG. 3. The configuration of FIG. 4 provides a lower cost solution ideal for customers only interested in data backup, data migration, data distribution, and data mining. FIG. 4 has a single fabric formed by two interconnected switches. With shorter distances, an even lower cost variant could use only one switch, such that there is no E-port. FIG. 5 illustrates an even more basic configuration using a fabric having a single switch 301, one host 102, and non-redundant controllers 105.

Because ports of controllers 105 are configured to handle both operational data transactions and DRM traffic, a single port connection between each controller 105 and switch 301 is all that is necessary to implement data replication features of the present invention. However, the basic configuration shown in FIG. 5 sacrifices much redundancy, and would not be recommended for most applications. It is important to understand that a great deal of flexibility exists in configuring the present invention for specific applications. Redundant connections and components can be added and removed flexibly to meet the needs of a particular application. Hence, various features of the configurations shown in FIG. 1 through FIG. 5 can be mixed and matched to configure a specific implementation.

A SAN, such as shown in FIG. 1 through FIG. 5, is established by coupling controllers 105 and hosts 102 to switch 301, or a fabric formed from multiple switches 301. Each of the devices performs a log in operation according to applicable fibre channel standards. The log in operation involves an exchange of information in which each device is registered with the fabric 103, and devices can discover other devices that are registered with fabric 103. In the preferred implementations, each controller 105 is identified by a storage cell unique identification number (UUID) which is stored by a name server in fabric 103. By way of this registration and discovery process, each controller 105 can obtain knowledge necessary to connect to any other controller 105.

As noted before, metadata needed to reconstruct a storage cell 101 including the UUIDs of the various objects in that storage cell is stored persistently. Because of this, in the event of a destination controller failure, another controller 105, typically a redundant or partner controller 105 in the same storage cell 101 as the failed controller 105, can reconstruct the storage cell 101. Other controllers 105 involved in a copy set can continue to locate the now reconstructed storage cell 101, and continue data replication operations without loss of data or requiring manual processes. The ability to implement this level of failure recovery substantially or wholly automatically is unprecedented.

In the event of a connection failure between a source controller 105 and a destination controller 105, the source controller 105 can readily identify each available alternate controller 105 and continue operation without loss of data or requiring manual intervention. A connection failure or link failure is distinct from a controller failure in that the controllers 105 remain operational, but unable to maintain a data communication link with one or more other controllers 105. In response to a connection failure, the source controller has several options, depending on the nature of the failure. When the source controller 105 is unable to link to fabric 103, suggesting a failure in a port of switch 301, the controller 105 can attempt to use an alternate link to fabric 103, or a redundant fabric 103 if available. When the link between fabric 103 and a destination controller 105 has failed, the source controller 105 attempts to establish a new link with a redundant port of the destination controller 105. In both of these cases, there will be no need to reconstruct the storage cell 101, and data replication operations will proceed with substantially no interruption, and in most cases without any need to notify the host 102 of the aberrant condition. In contrast, prior systems had only one port on each controller available for DRM operations and so a link failure would require reconstruction of either the source or destination LUN in an alternate controller.

In some cases a link failure may require migration of a LUN from one controller 105 to another. For example, if all ports on either the destination or source controllers 105 failed (which would typically be considered a controller failure), or several ports to fabric 103 failed simultaneously in particular combination, recovery would require migrating presentation of one or more LUNs from one controller 105 to a redundant or partner controller 105 in a manner similar to a controller failure event. This migration can be performed efficiently using the mechanisms for mapping and presenting a storage cell 101 described above. Notably, all LUNs do not need to be presented before pending data replication operations can be completed. In implementations where the LUNs are virtualized, as described in co-pending patent application Ser. No. 10/040,194 entitled "SYSTEM AND METHOD FOR ATOMIZING STORAGE" filed on Oct. 22, 2001 and which is assigned to the assignee of the present invention and incorporated herein by reference, it is possible to implement only so much of the data structures needed to represent the portion of the LUN that is the subject of a pending data transaction.

Figure 6:
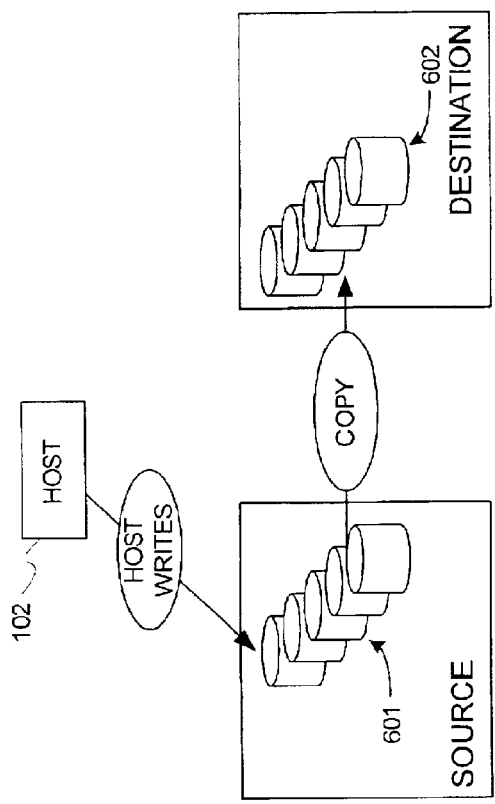
FIG. 6 shows data flow relationships in a data replication management operation in accordance with the present invention.

FIG. 6 shows hierarchical relationships defined in accordance with the present invention to model data replication management. Prior to performing DRM operations, a storage cell 101 is implemented at each site, and a virtual disk 601 is allocated within a storage cell 101 that is handing operational data with one or more hosts 102. For any particular copy set, one virtual disk 601 is designated as a source, although it should be understood that a source virtual disk 601 might be allocated at any site implementing the DRM features of the present invention. Virtual disk 601 may comprise a plurality of physical storage resources that span multiple physical drives within the storage cell 101, and may implement any desired capacity and data protection type.

A destination virtual disk 602 is allocated within a storage cell 101 at a designated alternative or destination site. In normal operation, write operations are directed to source virtual disk 601, and copied in a background process to one or more destination virtual disks 602. Destination virtual disk has the same logical storage capacity as the source virtual disk, but may provide a different data protection configuration. Controllers 105 of the destination storage cell handle the allocation of destination virtual disk 602 autonomously. This allocation involves creating data structures that map logical addresses to physical storage capacity, and in a particular implementation involve processed described in greater detail in U.S. patent application Ser. No. 10/040,194.

The actual allocation and copying of data may take up to several minutes to several hours in the case of storage of many gigabytes or terabytes. These processes can be streamlined by allocating and copying only logical storage blocks that are used in source virtual disk 601. For example, a virtual disk 601 may implement 1 terabyte of storage, but a sparsely populated example may use only a few gigabytes of capacity to store actual data. In accordance with the present invention, destination virtual disk 602 will reserve resources needed to implement the entire 1 terabyte, but will only allocate and copy the locations that are actually used to store data and may allocate the other locations. This greatly reduces the time required to create replicates.

A "copy set" is a set of member virtual disks where each member virtual disk is a replica of the others, and may comprise any number of replica virtual disks. While it may be easier to describe and understand the present invention by designating one virtual disk as a source or original virtual disk and the others as destinations or replicas, it is important to understand that once the copy set is created each member virtual disk is essentially a peer of all others. To create a copy set, the user designates a virtual disk as the source, and an alternate site storage cell (not a virtual disk) for the destination. The destination virtual disk does not exist prior to the copy set creation operation. Instead, it is created specifically to be a member of the copy set. Because each destination or alternative virtual disk is created on demand, it is created specifically and automatically to be compatible with the copy set. Hence, there is little or no manual procedures that must be performed to create new members for a copy set. This allows the copy set to increase (or decrease) its membership readily.

As noted before, a LUN is identified to a host 102 by a WWLID. One feature of a particular embodiment of the present invention is that each LUN in a copy set is presented to hosts 102 using the same WWLID. In this manner, the LUN appears to the host 102 as a single LUN that can be accessed by multiple paths. Preferably, each controller 105 that manages one of the LUNs in a copy set can be queried by a host 102 to determine a particular LUN or controller 105 (identified by the UUID) that is preferred (but not mandatory) for use by that host for access to the LUN. This feature supports large fan out in that any number of LUNs in a copy set can be presented as a single LUN with replication between the LUNs handled automatically by controllers 105 without involving hosts 102.

Initially, when a controller 105 at the destination site is requested to create a destination virtual disk, it determines whether its storage cell has sufficient resources (e.g., storage capacity) to service the request, reserves the necessary resources if available, and responds back to the controller 105 at the source site that the destination virtual disk is created. An existing virtual disk cannot be used for the destination. This process is very quick as the destination virtual disk is not actually allocated, and the data is not actually copied from source to destination at this time. Once the source virtual disk 601 receives this confirmation, it can continue normal operations while the actual allocation of virtual disk 602 and copying of data can occur as background processes. Hence, the actual time that source virtual disk 602 is quiesced during the data replication initialization is a few milliseconds. It is also possible that accesses to source virtual disk 601 can be cached or buffered during the initialization process so that no downtime is observed from the hosts 102. A controller may support tens, hundreds, or thousands of copy sets, limited only by the practical constraint of the computing resources (e.g., memory and processing power) needed to manage the number of copy sets.

To implement a copy transaction between a source and destination, a path to the alternate site is found and a connection is established. This connection need not be a persistent connection, although for data that frequently changes, a persistent connection may be efficient. Preferably, heartbeat is initiated over the connection. Heartbeats are in both directions, meaning the source site generates a heartbeat on each connection, and the alternate site(s) generates a heartbeat on each connection. Heartbeat timeout intervals are adaptive based on distance (computed round trip delay).

An attempt is made to choose paths by not moving the units between controllers. In other words, a controller that is used to create the source or destination virtual disks is initially preferred, which constrains the number of available paths initially. The chosen path/connection is used until it breaks, then an attempt is made to find another path. The port/path selection algorithm may include other default designations such as a preferred fabric or switch, or preferred ports on controllers, or similar default preferences that may operate to select among redundant resources.

Figure 7:
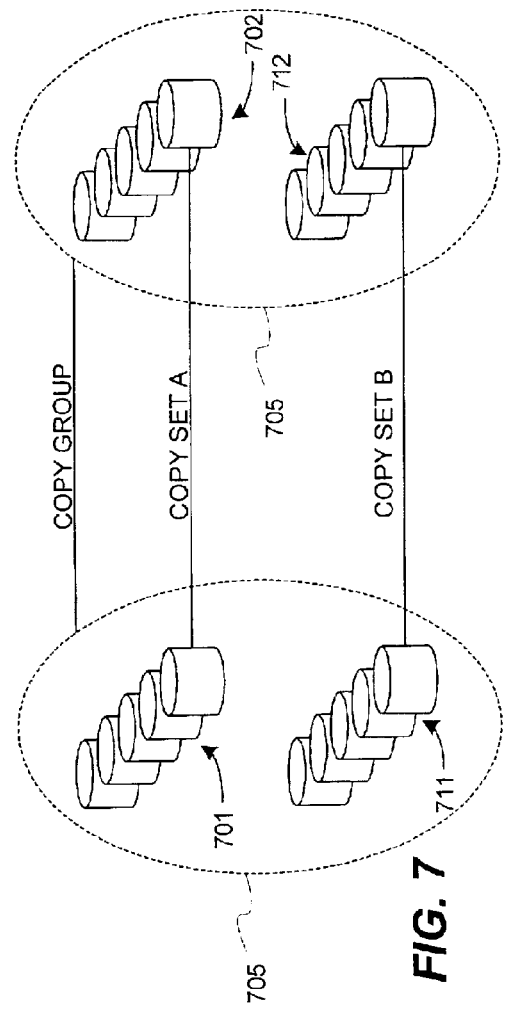
FIG. 7 illustrates logical relationships between data structures of the present invention.

In the preferred implementation, objects do not span sites or storage controllers. Instead, objects exist at each site and are associated with each other as suggested in FIG. 7. For instance, the controller views a "DRM Group" 705 as a source group associated with a destination group (represented by a dashed-line oval in FIG. 7). The controller does not have a copy set object per se, rather group members (virtual disks) that are associated with a remote member's (virtual disks). The copy set is represented by this association. In FIG. 7, virtual disks 701 are associated with virtual disks 702 to form a copy set and virtual disks 711 are associated with virtual disks 712 to form another copy set.

DRM groups 705 comprise a set of related virtual disks or LUNs that belong to copy sets all of which have the same source and destination. Multiple groups 705 can exist for a given source and destination combination. While in one sense a group 705 spans sites, in practice a separate logical object that represents a group is implemented in each site (i.e., each controller 105 managing a group). Hence, in another sense each group 705 comprises a set of source halves of copy sets (i.e., the source LUNs 701 and 711), or destination halves of copy sets (i.e., destination LUNs 702 and 712). A group 705 is considered a "local group" by the controller 105 that implements the group logical object, and is considered a "remote group" when implemented by another controller 105. In other words, whether a group 705 is local or remote is determined from the perspective of a particular controller 105. A local group 105 is associated with a remote group 105 when the LUNs contained in each group are in the same copy set. In a multidirectional implementation, each local group 705 will be associated with a plurality of remote groups 105.

In essence, a group contains a collection of LUNS for which a combined I/O stream must be replicated in the LUNs of each remote group to provide certain properties with regard to its interruption (e.g. a copy set holding a database and a copy set holding a journal related to the database). DRM groups 705 are used for maintaining crash consistency and preserving WRITE ordering. Crash consistency refers operation in the event that a host 102 or link to a host 102 crashes during a data transaction. In such event, it is important that the data transaction be committed to all members of the group or fail in all members of the group. In a database/journal implementation, for example, it is important to prevent a situation in which the database is modified, but the journal does not reflect the modification, or vice versa. The consistency property applies when the group has more than one member. In general, more than one virtual disk should be added to a group only if the application requires it. In most cases, a group should comprise only one member for optimal performance, in which cases the crash consistency behaviors are less important.

A group maintains write ordering among the members for asynchronous operation and logging/merging. Asynchronous operation refers to an operation mode in which a modification to one member of a copy set can be propagated to other members of the copy set after a time delay. During this time delay, the various replicas are inexact. When asynchronous operation is allowed, it is important that all replicas eventually implement the modification. Since multiple modification operations may be pending but uncommitted against a particular replica, it is necessary that the original order in which the modifications were presented be preserved when the pending modifications are applied to each replica. Even where asynchronous operation is not explicitly allowed, a destination LUN may become unavailable for a variety of reasons, in which case a copy set is implicitly operating in an asynchronous mode.

To ensure write order preservation, a record is maintained in a non-volatile storage device such as a cache for each group 705 that records the history of write commands and data from a host. The record is sized to store all write transactions until the transaction is committed to each member of a copy set. When required, the record can be written to a log on media-based storage and then later be replayed to merge the pending writes, in order, to each remote group 705. The ordering algorithm uses a "group sequence number" and the remote groups 705 ensure that the data is written in order sequence. Group members enter and exit logging at the same time, to assure order across the volumes.

Virtual disks in a group should have the same alternate site. A group is limited to 32 virtual disks in a particular implementation. A virtual disk can belong to at most one group. Virtual disks in the same DRM group 705 may belong to different disk groups. When a group object is created on the primary site controller, the controller automatically creates a symmetric group object on the alternate site controller. A group is created during copy set creation, if the user chooses not to use an existing group.

At a site, all members of a group are accessed on the same controller in a dual pair to enforce cache coherency (i.e., not split between dual controllers). The preferred storage controller should be the same on all members. When members are added to a group, they are automatically moved to reside on the same controller, and thereafter will failover together. If the preferred storage controller is changed on one member, it will change the setting for all members. These constraints create a configuration in which all members in a group share the same connection/path between source and destination sites. Different groups may share the same connection/path to the same alternate site or a different one. If more than one member in a group needs to copy, then they are copied one at a time with a queue depth selected to keep the pipe full for optimal performance.

One benefit of the flexible architecture described above is that the number of replicas in a copy set can be increased. As noted hereinbefore, conventional systems allow only one replica in a given copy set. In accordance with the present invention, any number of replicas can be included in a copy set. This is because roles can be switched dynamically between source and destination which eases propagation of data across multiple members. Also, because the storage at each site is virtualized, LUNs of any desired size and configuration can be automatically configured from physical storage capacity available at that site. Accordingly, there is no need to specially configure hardware or software at each site in order to implement a LUN that is compatible with a given copy set. Because each controller 105 can automatically increase the size or change the configuration of the LUN(s) it manages, the manual tasks involved to increase the size of a LUN do not grow geometrically or exponentially with the number of replicas in the copy set. Instead, the user simply manages the LUN as a single entity, and the implementation of changes in each replica is handled automatically.

It is apparent that the system of the present invention provides efficiency in that redundant components can operate simultaneously and in parallel to provide improved throughput as well as serving during failover to replace functionality of failed systems and connections. Because system components have few constraints on their functionality, the present invention allows great flexibility in implementing a particular system to emphasize any balance of, for example, low latency, high availability, disaster tolerance, and cost.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for replicating data between a first storage location and a second storage location, the system comprising:
    a data communication network having an interface for receiving data access requests from one or more host systems;
    a first storage location comprising a controller having at least two ports to the data communication network and a first pool of storage;
    a second storage location comprising a controller having at least two ports to the data communication network and a second pool of storage;
    wherein both of the at least two ports communicate both with the one or more host systems to handle host data operations and with each other and to handle data replication operations.

2. The system of claim 1 wherein the data communication network comprises a plurality of sub-networks, and each of the at least two ports is coupled to a separate one of the plurality of sub-networks.

3. The system of claim 1 wherein both the first storage location and the second storage location include processes enabling their controllers to function as sources of replicated data.

4. The system of claim 1 wherein both the first storage location and the second storage location include processes enabling their controllers to function as destinations for replicated data.

5. The system of claim 1 further comprising a third storage location comprising a controller having at least two ports to the data communication network and a third pool of storage;
    wherein both of the at least two ports of the third storage location communicate both with the one or more host systems to handle host data operations and with the first and second storage locations to handle data replication operations.

6. The system of claim 1 wherein the first storage location comprises more than two ports to the communication network.

7. The system of claim 1 wherein the first storage location comprises two controllers each having at least two ports to the data communication network and the first pool of storage.

8. A data replication controller comprising:
    a data processor system configured to implement software processes;
    at least one host port;
    a pool of storage accessible through the data processor system;
    processes executing in the processor to enable the at least one host port to couple to an external communication network;
    processes executing in the processor operable to designate a source virtual disk in the pool of storage; and
    processes executing in the processor operable to create a destination virtual disk in the pool of storage.

* * * * *